United States Patent [19]

Schön

[11] Patent Number: 5,222,274

[45] Date of Patent: Jun. 29, 1993

[54] WINDSHIELD WIPER ARM, IN PARTICULAR FOR MOTOR VEHICLES

[75] Inventor: Wilfrid Schön, Saint-Etienne/USSON, France

[73] Assignee: Valeo Systemes D'Essuyage, Montigny-le-Bretonneux, France

[21] Appl. No.: 768,826

[22] Filed: Sep. 30, 1991

[30] Foreign Application Priority Data

Oct. 3, 1990 [FR] France ............... 90 12170

[51] Int. Cl.⁵ .................. B60S 1/32; B60S 1/34
[52] U.S. Cl. ................. 15/250.31; 15/250.35
[58] Field of Search ........ 15/250.34, 250.35, 250.31, 15/250.20, 250.19, 250.18

[56] References Cited

U.S. PATENT DOCUMENTS

| 1,920,145 | 7/1933 | Hueber ............... | 15/250.34 |
| 1,956,516 | 4/1934 | Hueber et al. ....... | 15/250.34 |
| 1,973,481 | 9/1934 | Horton et al. ....... | 15/250.34 |
| 2,126,637 | 8/1938 | Horton ............... | 15/250.34 |
| 2,619,668 | 12/1952 | Sivacek .............. | 15/250.34 |

FOREIGN PATENT DOCUMENTS

| 2036960 | 1/1972 | Fed. Rep. of Germany ... | 15/250.19 |
| 2346292 | 9/1972 | Fed. Rep. of Germany . | |
| 3427199 | 7/1984 | Fed. Rep. of Germany . | |
| 1073937 | 3/1954 | France ............... | 15/250.34 |
| 2103349 | 7/1971 | France . | |
| 2499920 | 8/1982 | France ............... | 15/250.35 |
| 410391 | 4/1949 | Italy .................. | 15/250.34 |
| 636637 | 5/1950 | United Kingdom ..... | 15/250.34 |
| 2188537 | 4/1987 | United Kingdom . | |

Primary Examiner—Harvey C. Hornsby
Assistant Examiner—Gary K. Graham
Attorney, Agent, or Firm—Morgan & Finnegan

[57] ABSTRACT

A windshield wiper comprises a housing in the form of a U, carrying a pivot pin which cooperates in a recess formed in a driving head, together with a spring carried by a support element, with the said spring acting between the driving head and the shroud.

The driving head has an inclined groove, within which one end of a support bar for the spring is displaceable in sliding movement between a position in which the shroud is locked on the driving head, and a position in which it is unlocked and removable from the latter.

9 Claims, 1 Drawing Sheet

WINDSHIELD WIPER ARM, IN PARTICULAR FOR MOTOR VEHICLES

FIELD OF THE INVENTION

This invention relates to windshield wiper arms, particularly though not exclusively for motor vehicles.

BACKGROUND OF THE INVENTION

For sweeping glass surfaces so as to obtain good visibility through them, it is known to use wipers which oscillate in alternating movement so as to sweep against the surface to be swept. Such wipers will be referred to herein for convenience as windshield wipers and are to be understood to comprise one or more wiper blades. Each wiper blade is usually driven through an appropriate articulation by a wiper arm which is itself driven in alternating rotational movement by an output spindle or shaft of a drive mechanism carried by the body of the vehicle. In known windshield wipers, the coupling between the output spindle of the drive mechanism and the wiper arm comprises a driving head which is part of the wiper arm and which is secured on the output spindle, usually by means of a nut.

An articulation or pivot, defining a pivot axis and generally comprising a rivet, is arranged between the driving head and the shroud of the wiper arm at the level of the driving head. A spring is interposed between the shroud and the driving head, so that during operation the spring urges the windshield wiper arm, with its blade, with a substantial pressure against the swept surface. The shroud is usually of a transverse cross section in the form of a U and encloses the spring between its two projecting side walls or wings. This spring may be arranged, in different embodiments, either as a compression spring or as a tension spring.

It is important that the windshield wiper arm can easily be replaced. To this end, it is currently necessary to move the arm away from the glass by pivoting it about the above mentioned pivot. After moving a protective cap, it is then necessary to unscrew the fastening nut which holds the driving head on the driving spindle, in order to replace the arm. This requires the use of a tool such as a key or spanner for unlocking the nut. Such a tool is not always available.

It has already been proposed, in the specification of French published patent application No. FR 2 103 349A, to provide a windshield wiper arm which is arranged on a drive spindle, in which the said arm has no driving head, but has a single pivot pin which is inserted into a groove provided in the drive spindle. The arm is retained on the spindle by means of a resilient member such as a band. This assembly renders it necessary to provide a machined recess in the drive spindle, and the latter has to be indexed with respect to the swept surface in order that the angle through which the wiper blade sweeps on the swept surface is correctly orientated.

In addition, such an assembly also has the drawback that the arm is not retained in a position fully spaced away from the swept surface, in view of the fact that in this position, the resilient member no longer engages on the shaft, and the pivot axis can be dislodged by the weight of the arm itself from the recess in which it is engaged.

DISCUSSION OF THE INVENTION

An object of the present invention is to overcome these drawbacks and to enable a windshield wiper arm to be fitted, secured and removed by a simple snap-fitting operation.

In accordance with the present invention, a windshield wiper, in particular for a motor vehicle, comprising: a shroud in the form of an inverted U, carrying a pivot pin which is adapted to cooperate with a recess carried by a driving head, which is driven in alternating rotation about an axis defined by a hole carried by the said driving head; and a resilient member, one end of which acts on the shroud, with its other end acting on the driving head through one end of a spring support bar, is characterised in that the driving head has an inclined groove, within which the end of the support bar slides between a locking position and an unlocking position for the said shroud.

It is thus possible, firstly to remove and replace a windshield wiper arm very easily without needing any tool, while leaving the driving head secured on the drive spindle, while secondly, the drive spindle does not need to be modified and is therefore able to carry different types of windshield wiper arm.

Further features and advantages of the invention will appear more clearly from the description that follows, of a preferred embodiment of the invention, given only by way of non-limiting example and with reference to the accompanying drawings.

DESCRIPTION OF A PREFERRED EMBODIMENT OF THE INVENTION

Figure 1:
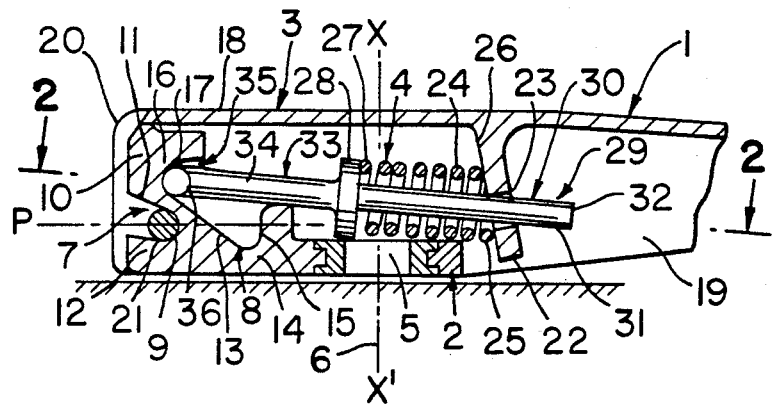
FIG. 1 is a diagrammatic view in cross section, showing a windshield wiper arm in position in use.
Figure 2:
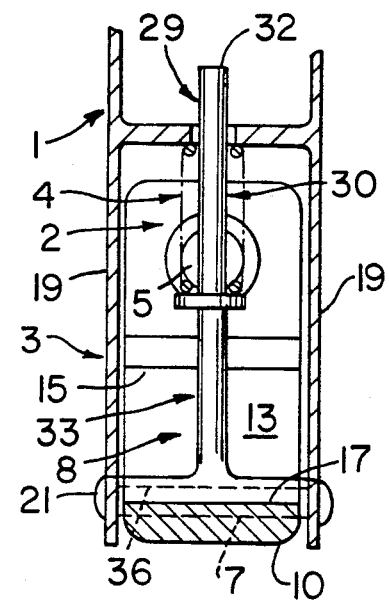
FIG. 2 is a view in cross section taken on the line 2—2 in FIG. 1.

In FIGS. 1 and 2, a windshield wiper arm 1 comprises a driving head 2, a shroud or housing 3 and a resilient member 4 in the form of a coil spring of the compression type. The driving head 2 has a through hole 5 by which it is mechanically connected to a drive spindle 6, indicated diagrammatically in FIG. 1 by a phantom line representing its axis of rotation XX'. The wiper arm 1 further includes a transverse recess 7 which is spaced away from the hole 5 and in a direction at right angles to the axis XX', and an inclined groove 8 lying between the axis XX' and the transverse recess 7. The groove 8 is inclined with respect to the axis XX'.

The transverse recess 7 has a base wall 9, semi-cylindrical in form and facing towards one end 10 of the driving head 2, i.e. the left hand end in FIG. 1, through inclined surfaces 11 and 12 which are slightly divergent away from each other and which extend in a direction that is not at right angles to the axis XX', with which they define an acute angle so as to constitute an open groove at the end 10 of the driving head 2.

The inclined groove 8 extends in a direction substantially the same as that of the recess 7, and comprises an inclined flat surface 13, which again defines an acute angle of inclination with respect to the axis XX'. The surface 13 terminates at one of its longitudinal ends 14 in a first base wall 15, semi-cylindrical in form. This end 14 of the inclined flat surface 13 lies level with, but spaced away from, the hole 5, and also lies below a horizontal plane P which passes through the longitudinal axis of the semi-cylindrical wall 9 of the recess 7. At the other end 16 of the inclined flat surface 13, the latter is joined to a second base wall 17, again semi-cylindrical in shape and parallel to the first base wall 15. The base wall 17 lies above the plane P.

In cross section, the shroud 3 is generally in the form of an inverted U, so as to overlie the driving head 2. The shroud 3 comprises a central body 18 which extends at right angles to the angle XX', and has two branches 19 (FIG. 2) which are arranged on either side of the driving head, towards which they extend.

One end 20 of the shroud, i.e. that situated on the left hand side of FIG. 1, carries a pivot pin 21. The shape of the latter is substantially cylindrical, so as to match that of the base wall 9 of the transverse recess 7. The pivot pin 21 extends in the same direction as the latter. An abutment wall 22, spaced away from the pivot pin 21 in the direction away from the end 20, is arranged substantially at right angles to the body 18 of the shroud and to the two branches 19. The abutment wall 22 has a circular hole 23, the purpose of which will be explained below.

The shroud 3 is of course extended at its other end in known manner, in such a way as to carry a windshield wiper blade articulated o the arm in the usual way.

The compression spring 4 is arranged between the driving head 2 and the shroud 3, with one of its ends 25 bearing on the outer surface 26 of the abutment wall 22 that faces towards the driving head. The other end 27 of the spring 4 bears on a collar 28 which is formed on a spring support bar 29.

The spring support bar 29 comprises a first bar portion 30 on one side of the collar 28 and a second bar portion 33 on its other side. The first bar portion 30 extends from a first side of the collar 28, i.e. towards the abutment wall 22, and comprises a pin 31, of smaller diameter than the collar 28 and having a free end 32 which passes through the spring 24 and through the hole 23 in the abutment wall 22. The second bar portion 33 extends from the other, i.e. a second, end of the collar 28 towards the left hand end 10 of the driving head 2. The bar portion 33 is again in the form of a pin, 34, of smaller diameter than the collar 28 and having a free end 35 which terminates in a bar 36 (best seen in FIG. 2) which extends at right angles to the pin 34. The bar 36 has a circular outer wall complementary to the first base wall 15 and the second base wall 17 of the inclined groove 8, and as seen in FIG. 1 it is in engagement on the base wall 17.

Thus, in the operating position shown in FIG. 1, the driving head 2 is driven in alternating rotational movement by the drive spindle 6, and the housing 3 is able to pivot in the transverse recess 7 by means of its pivot pin 21, while the whole of the housing or shroud is resiliently biased towards a surface that is to be swept by the windshield wiper (e.g. the outer surface of a motor vehicle windshield, not shown) by the compression spring 24. The points at which forces are applied by the latter are firstly, as regards the shroud, on the outer surface 26 of the abutment wall 22, and secondly, as regards the driving head, at the level of engagement of the bar 36 in the second base wall 17, thus producing a resultant force which tends to cause the whole of the arm 1 to pivot towards the swept surface.

Figure 3:
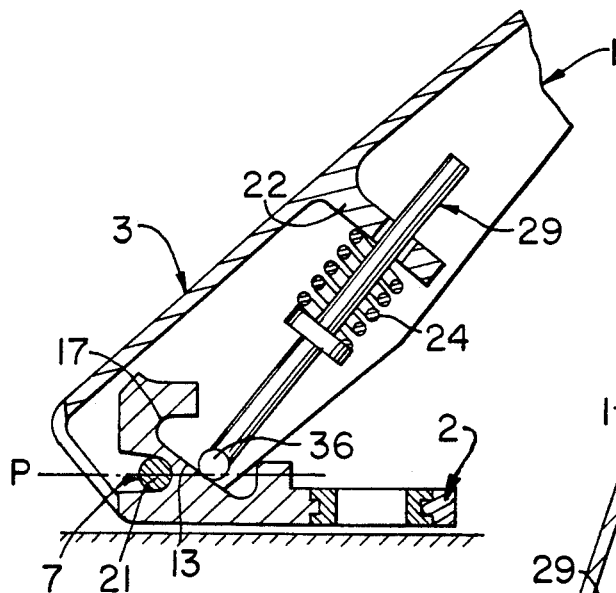
FIG. 3 is a diagrammatic view in cross section showing the windshield wiper arm in an intermediate position.
Figure 4:
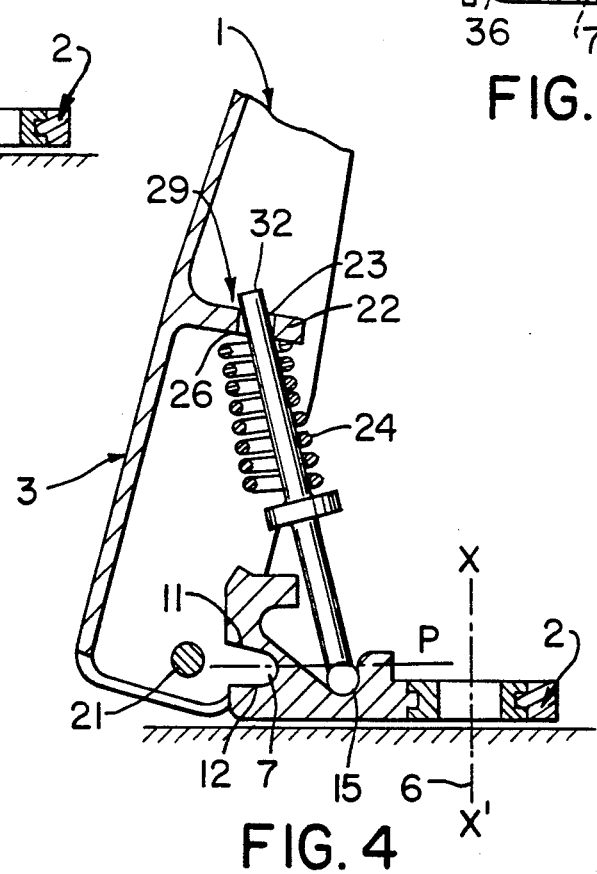
FIG. 4 is a diagrammatic view in cross section showing the windshield wiper arm in position for fitting or removal.

Referring to FIGS. 3 and 4, removal of the windshield wiper arm 1 and separation of the shroud 3 from the driving head is carried out in the following manner.

Initially, and as shown in FIG. 3, the shroud 3 and the arm are together moved pivotally in the anti-clockwise direction about the pivot pin 11 in the recess 7 to the position shown in FIG. 3. In order to reach this position, the bar 36 of the spring support bar 29 is displaced away from the second base wall 17. When the point at which the force exerted by the spring on the wall 22 lies above the point at which the spring force is applied by the bar 36 to the driving head 2, the spring 24 causes the bar 36 to slide along the inclined surface 13 of the inclined recess 8 until the point of contact between the surface 13 and the bar 36 lies in the plane P. In this position, the resultant force exerted by the spring 4 is nil, and the arm is then in unstable equilibrium.

When the movement is continued so as to reach the position shown in FIG. 4, the bar will have continued to slide under the action of the spring 24 until it passes below the plane P, to come into contact with the first base wall 15 as shown in FIG. 4, so that the base wall 15 then retains the bar 36 against axial movement of the support bar 29. In this position, the shroud 3 is to some extent still able to pivot around the point of engagement of the spring 24 on the surface 26 of the abutment wall 22, but the spring exerts no other force. During this movement, the pivot pin 21 is easily able to be displaced out of the transverse recess 7, due to the disposition of the inclined surfaces 11 and 12. It is then sufficient to raise the whole of the arm 1 upwardly (FIG. 4) so that the hole 23 in the wall 22 slides beyond the end 32 of the support bar 29, thus releasing the arm from the latter.

Thus, after removal of the shroud, the driving head 2 remains fixed to the spindle 6, and can easily be replaced with another shroud. Fitting of the shroud is carried out as a simple reversal of the removal process just described, i.e. the fitting is illustrated in FIGS. 4, 3 and 1 in that order.

Numerous modifications may of course be introduced to the arrangement described above, in particular by substituting means which are technical equivalents, without departing from the scope of the claimed invention.

What is claimed is:

1. A removable windshield wiper arm comprising:
   a driving head defining an axis of rotation for alternating rotational movement of the arm and having a fastening hole concentric with said axis of rotation, said driving head having an open ended elongated pivot recess defining a longitudinal recess pivot axis and said head having an inclined groove portion having first and second end walls and a side wall inclined at an acute angle relative to said axis of rotation, said driving head further having a horizontal plane generally perpendicular to the axis of rotation and passing through the recess pivot axis and through the groove between said end walls;
   a shroud member having a base portion and an abutment member extending from the base portion, the abutment member having an opening;
   a pivot pin disposed on said shroud member and receivable in said pivot recess;
   a support bar having a first end slidable receivable in said inclined groove and selectively engageable with the first and second end walls and said side wall of said inclined groove, and a second end movably receivable in said abutment member opening;

a collar member disposed on said support bar between said first and second ends of said support bar; and a biasing member disposed between said collar member and said abutment member for exerting a force against said collar member and abutment member such that pivoting said shroud member about said pivot pin selectively engages the first end of said support bar with the first and second end walls of said inclined groove, such that when the first end of the support bar engages the first inclined groove end wall, the wiper arm is in a locked position with the biasing member exerting a locking force against said collar and abutment member, and when the first end of the support bar engages the second inclined groove end wall, the wiper arm is in an unlocked position with the biasing member exerting against the collar and abutment member a force less than said locking force such that the second end of the support bar may be withdrawn from the abutment opening and the pivot pin removed from the pivot recess and the shroud member removed from the driving head.

2. A windshield wiper arm according to claim 1, wherein the second end wall of said inclined groove is disposed below said plane.

3. A windshield wiper arm according to claim 1, wherein said unlocked position is reached when the first end of the support bar lies below said plane.

4. A windshield wiper arm according to claim 1, wherein said locked position is reached when the first end of the support bar lies above said plane.

5. A windshield wiper arm according to claim 1, further comprising a further bar carried by the said support bar at right angles thereto.

6. A windshield wiper arm according to claim 1 wherein said pivot recess is defined by an arcuate end wall and a pair of spaced apart side walls each of said side walls being inclined relative to said axis of rotation.

7. A windshield wiper arm according to claim 6 wherein said side walls of said pivot recess diverge from each other.

8. A windshield wiper arm according to claim 6 wherein said side walls of said pivot recess extend in substantially the same direction as the side wall of said driving head inclined groove.

9. A windshield wiper arm according to claim 1, wherein the first end wall of said inclined groove is disposed above said plane.

* * * * *